Sept. 4, 1934.   F. I. GETTY   1,972,090
ILLUMINATED SIGNAL

Original Filed Nov. 1, 1930   2 Sheets-Sheet 1

Inventor
Fred I. Getty

By Brower & Phelps
Attorneys

Sept. 4, 1934.   F. I. GETTY   1,972,090
ILLUMINATED SIGNAL
Original Filed Nov. 1, 1930   2 Sheets-Sheet 2
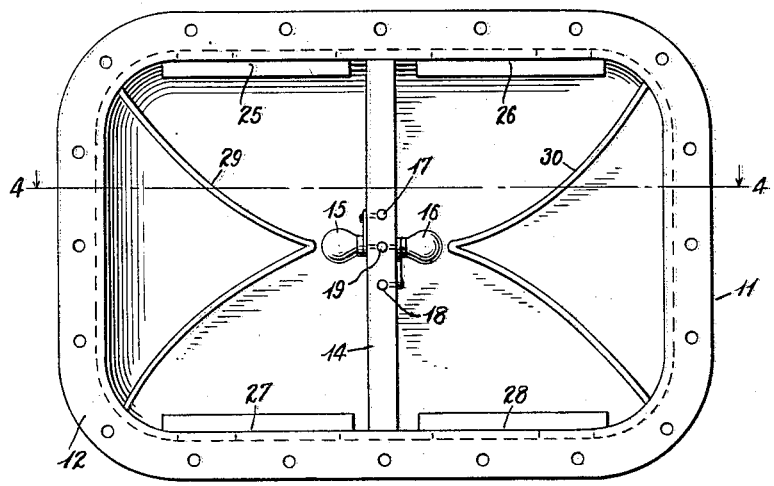
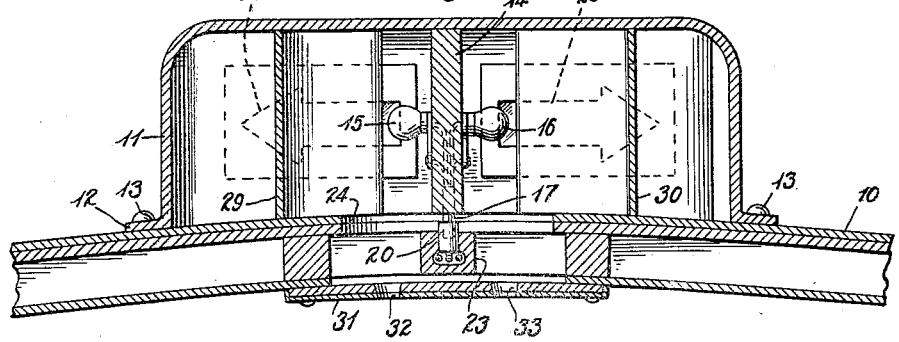
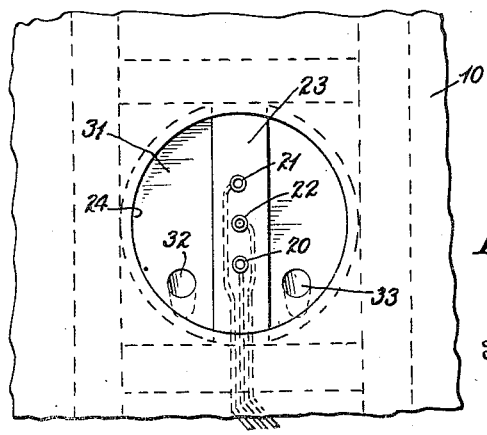
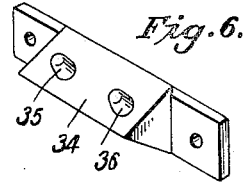
Inventor
Fred I. Getty
By Brower & Phelps
Attorney Patented Sept. 4, 1934

1,972,090

UNITED STATES PATENT OFFICE 1,972,090

ILLUMINATED SIGNAL

Fred I. Getty, Jennings, La.

Application November 1, 1930, Serial No. 492,805
Renewed September 26, 1933

2 Claims. (Cl. 177—329)

The invention relates to signals particularly applicable to vehicles and is shown as embodied in a direction signal for a vehicle.

It is an object of the invention to provide a signal which may be visible from both the front and rear of the vehicle using but one light for each direction indicated, which light is visible from both the front and rear.

It is a further object of the invention to provide a signal applicable to the roof of the vehicle visible from both front and rear.

It is a further object of the invention to provide a signal applicable to the roof of the vehicle having means to illuminate an indicator upon the dash of the vehicle by direct rays of the signal light itself.

It is a further object of the invention to provide a signal applicable to the roof of the vehicle which may be very readily removed therefrom.

Further objects of the invention will appear from the following description when read in connection with the accompanying drawings showing an illustrative embodiment of the invention and wherein:—

Fig. 3 is a bottom plan view of the signal box;

Fig. 4 is a vertical section on line 4—4 of Fig. 3;

Fig. 5 is a detail plan view of the central portion of the seat of the signal casing; and Fig. 6 is a perspective view of a dash indicator.

Figure 1:
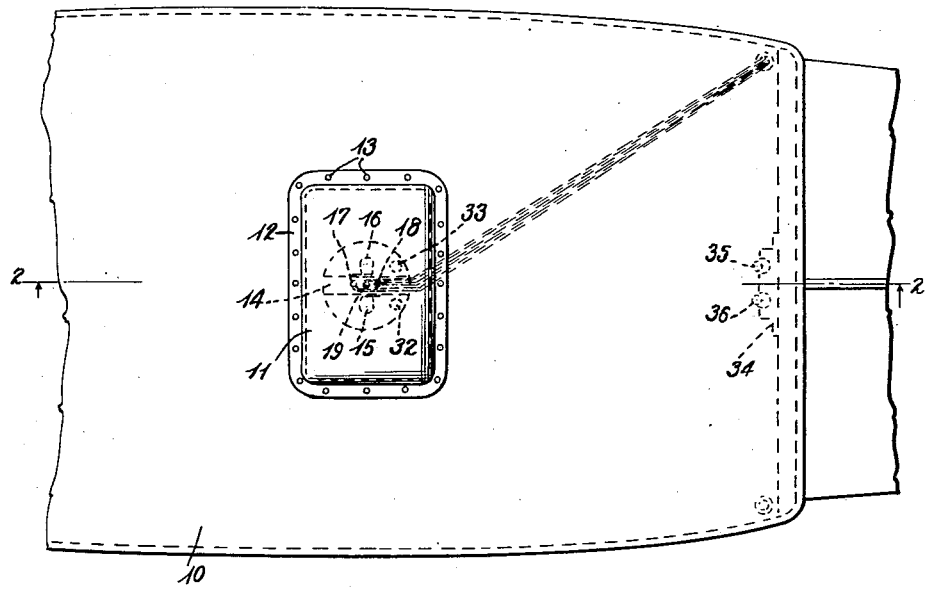
Fig. 1 is a plan view of the signal showing the body of a vehicle in dotted lines.
Figure 2:
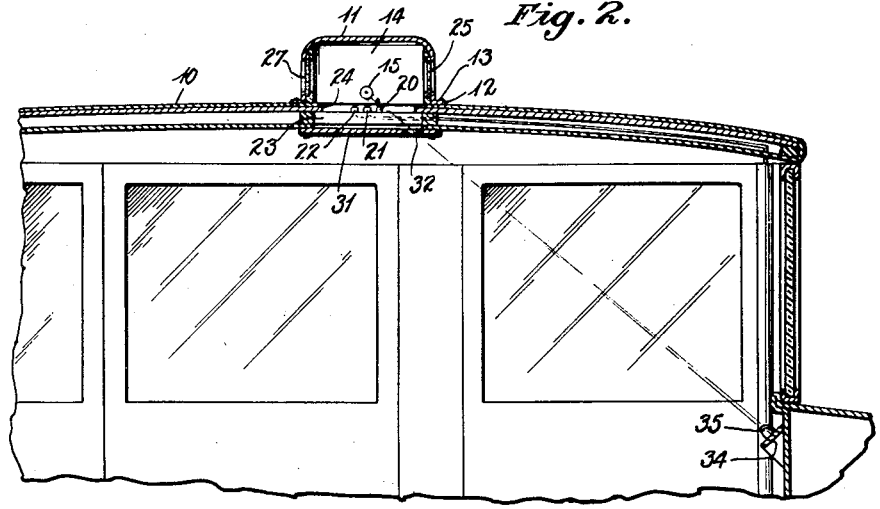
Fig. 2 is a central vertical section on line 2—2 of Fig. 1.

As shown the device is indicated as carried by the roof 10 of a closed vehicle body. The casing 11 of the signal is shown as formed with a flange 12 which may be secured to the roof of the vehicle as by screws 13. The casing 11 comprises a central partition 14 having signal lamps 15, 16 mounted upon opposite sides thereof, one pole of the socket of each lamp being connected to a stud 17, 18 projecting below the partition 14 and the other pole of each socket being connected to a common stud 19, the three studs adapted to be engaged with sockets 20, 21, 22 carried by bar 23 extending centrally of a recess 24 in the roof of the vehicle, the recess being otherwise upwardly open into the casing 11 for a purpose to be described.

The sockets 20—22 are shown as connected to appropriate wiring passing within the top and downwardly in a column of the automobile body for electric connection with appropriate circuit closers, battery connections, ground, etc.

To display the desired signal the front and rear sides of the casing 11 are shown as provided with openings 25, 26, 27, 28 which may be in the form of arrows pointing in the direction it is desired to indicate and which may be covered with red glass. To direct the light upon the windows or openings 25—28, there are shown reflectors 29, 30 one in each side of the casing. To enable the driver to know that the desired signal is in operation, the chamber 24 is shown as opening to the interior of the body of the vehicle and a closure 31 preferably in the form of a metallic plate is screwed over said opening, said closure being formed with a pair of perforations 32, 33 through which the rays of lamps 15, 16 may project. In alignment with the rays of the lamps, there is located upon the dash of the vehicle a fixture comprising a plate 34 preferably enameled to correspond to the interior finish of the vehicle, which plate bears a pair of studs 35, 36 of bright metal as nickeled or the like.

While round openings 32, 33 and studs 35, 36 are illustrated, it may for some types of service be desirable to form the studs 35, 36 or the openings 32, 33, or both of a form other than round as in the form of an arrow pointing in the appropriate direction. Obviously also, the windows 25—28 may be in the form of perforated plates made up of letters to form the words "right" and "left" if preferred.

When one of the lamps 15, 16 is illuminated its rays fall upon the corresponding boss or projection 35, 36 and will be visible to the operator thereby serving as an indication that the signal is in operation.

Minor changes may be made in the physical embodiment of the invention within the scope of the appended claims without departing from the spirit thereof.

I claim:

1. A direction signal for vehicles comprising, in combination, a vehicle roof, an illuminated signal mounted thereon comprising a casing bearing the signal means, a lamp in said casing, illuminable indicating means carried on the dash of the vehicle, and means whereby both said dash means and said signal means are illuminated by said lamp.

2. A direction signal for vehicles comprising, in combination, a vehicle roof having openings, a signal casing mounted over said openings and bearing translucent signal means, lamps in said casing to illuminate said signal means, illuminable indicating means carried by the interior of the vehicle body within view of the driver and in alignment with the respective lamps and corresponding openings whereby both the signal means and the corresponding illuminable means are illuminated by the respective lamps.

FRED I. GETTY.